Figure 1:
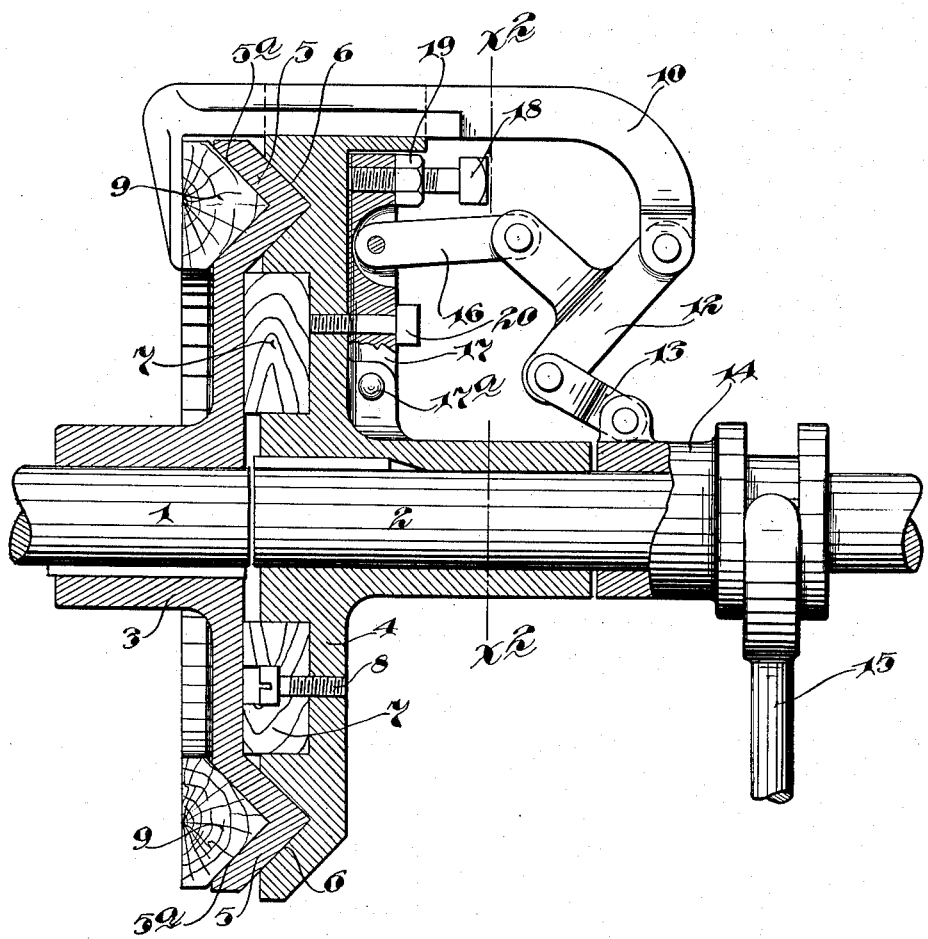

A. E. JACOBSON.
FRICTION CLUTCH.
APPLICATION FILED NOV. 2, 1910.

1,025,190.

Patented May 7, 1912.

3 SHEETS—SHEET 1.

Witnesses
E. C. Skinkle
Harry Opsahl.

Inventor:
Axel E. Jacobson
By his Attorneys
Williamson & Merchant

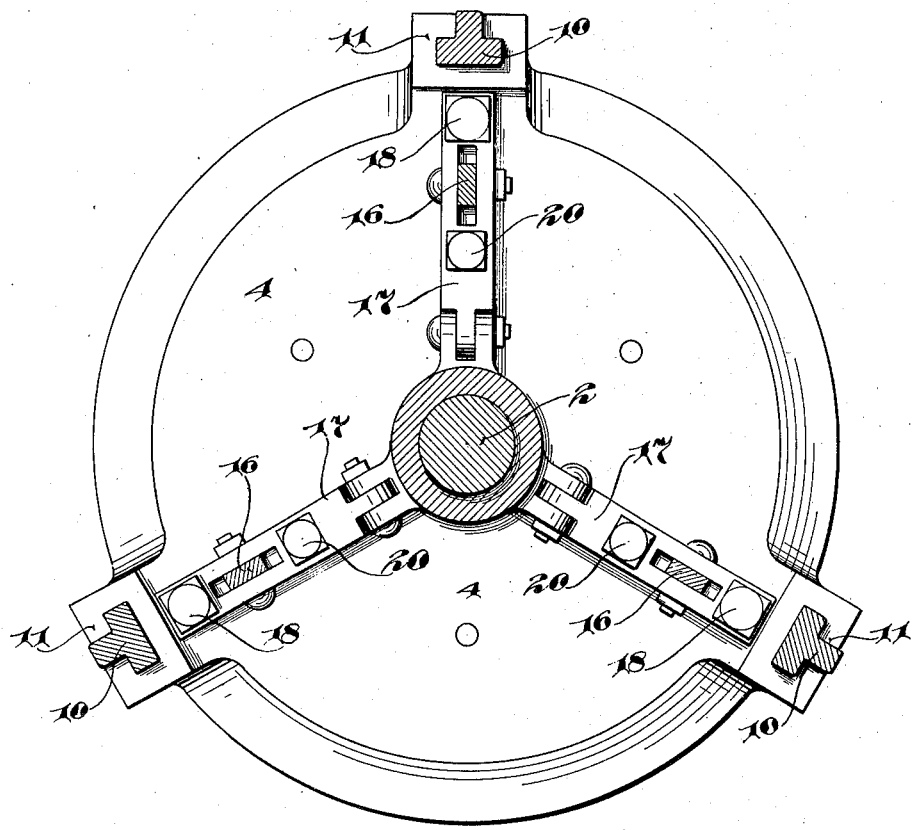

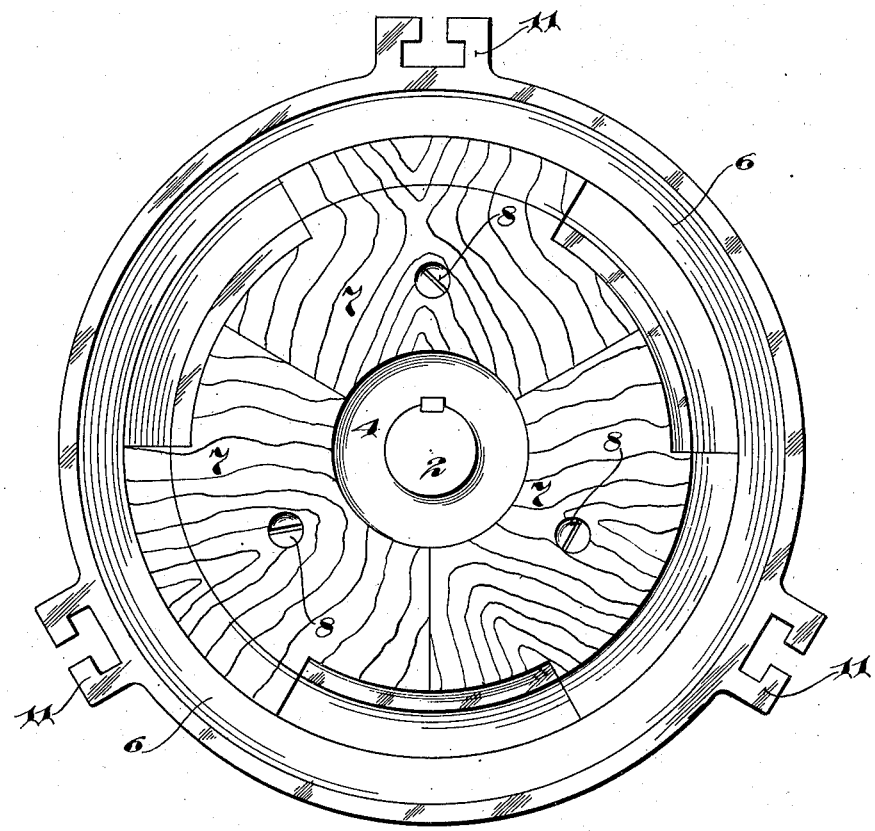

UNITED STATES PATENT OFFICE.

AXEL E. JACOBSON, OF MINNEAPOLIS, MINNESOTA.

FRICTION-CLUTCH.

1,025,190.  Specification of Letters Patent.  Patented May 7, 1912.

Application filed November 2, 1910. Serial No. 590,251.

*To all whom it may concern:*

Be it known that I, AXEL E. JACOBSON, a citizen of the United States, residing at Minneapolis, in the county of Hennepin and State of Minnesota, have invented certain new and useful Improvements in Friction-Clutches; and I do hereby declare the following to be a full, clear, and exact description of the invention, such as will enable others skilled in the art to which it appertains to make and use the same.

My invention has for its object to provide an improved friction clutch, and to this end the invention consists of the following devices and combination of devices hereinafter described and defined in the claims.

In the accompanying drawings which illustrate the invention, like characters indicate like parts throughout the several views.

Referring to the drawings, Figure 1 is a view chiefly in vertical section, with some parts shown in full illustrating the preferred construction of the improved clutch; Fig. 2 is a transverse section taken approximately on the line $x^2\ x^2$ of Fig. 1; Fig. 3 is a view showing one of the clutch members looking at the face thereof.

Numerals 1 and 2 indicate two axially alined shafts, the former of which is assumed to be the constantly driven member and the latter of which is to be coupled to and uncoupled from said driven shaft 1, by means of the improved clutch. This clutch comprises two main clutch members 3 and 4 having disk-like faces with engaging V-shaped annular frictional surfaces, which, when engaged, insure true alinement of the two shafts 1 and 2. The hub of the clutch member 3 is keyed to the driven shaft 1 and the hub of the clutch member 4 is keyed to the driven shaft 2. As shown, the annular V-shaped engaging surfaces of the two clutch members is afforded by laterally projecting annular flange 5 on the clutch member 3 which is engageable with an annular V-shaped groove 6 in the face of the peripheral portion of the clutch member 4.

Segmental friction blocks 7, of wood or similar non-metallic material, are seated in the face of the clutch member 4 inward of the groove 6 and are preferably extended to the hub of the said clutch member. The friction blocks 7 are shown as secured to the clutch member 4 by counter sunk screws 8.

The so-called annular V-shaped flanges 5, in their backs are formed with a V-shaped annular groove $5^a$ that is adapted to be engaged by segmental friction shoes or blocks 9, the faces of which are made V-shaped, in cross-section, to fit the groove $5^a$. These friction shoes 9 are shown as secured to the inwardly extended ends of clamping bars 10, slidably mounted and projecting guide lugs 11, of the clutch member 4, for sliding movements parallel to the axes of the shafts 1 and 2. The extended ends of the clamping bars 10 are connected to the outer ends of three armed levers 12, the inner ends of which levers are connected by links 13 to lugs of a shipper sleeve 14 that is mounted loosely on the shaft 2, and is subject to a suitable shipper lever 15. The intermediate arm of each lever 12 is connected by a link 16 to an abutment in the form of a pivoted block or arm 17, which is pivotally attached at $17^a$ to a lug on the clutch member 4.

As shown, there are three clamping members 10 and lever connection described. The free ends of the pivoted abutments 17 are provided with set screws 18 by means of which they may be set at different distances from the back of the clutch member 4. As shown, the set screws 18 have threaded engagement with the abutment 17, and press against the clutch member 4, and are adapted to be locked in the properly adjusted position by means of lock nuts 19. Other set screws 20, which work loosely through perforations in the abutments 17, and are screwed into seats in the clutch member 4, lock the said levers against outward movements or movements away from the back of the clutch member 4.

By movement of the sleeve 14 away from the clutch member 4, the clutch member 3 may be engaged from or thrown out of frictional engagement with the said clutch member 4, each friction block 7 and, also, out of engagement with the friction shoes 9, so that the shaft 1 will freely rotate while the shaft 2 remains stationary. By movement of the said sleeve 14 toward the clutch member 4, however, the parts may be thrown into the position shown in Fig. 1, in which position the two clutch members 3 and 4 are connected so that they will cause the shaft 2 to rotate on the shaft 1. It will be noted that the said position of the parts shown in Fig. 1, the pivotal connection between the links 16 and the intermediate arms of the lever 12 is slightly outward of a dead center or of a straight line drawn between the pivotal connections between said lever 12 and clamping bar 10 on one end and the links 16 and abutments 17 on the other end. This operation, of course, simultaneously takes place in all of the three connections so that when the clutch members are engaged, they will be held in frictional engagement by the connections themselves and without requiring pressure to be maintained on the sleeve 14 by the shipper lever 15.

Attention is called to the very large amount of frictional surface between the clutch members. The V-shaped annular engaging surfaces between the members 4, 5 and 9, in themselves, afford a strong friction clutch which also serves to positively hold the clutch members 3 and 4 and the shafts 1 and 2 in true axial alinement. Furthermore, the frictional engagement between the friction blocks 7 of the clutch member 4 and the face of the clutch member 3, adds greatly to the frictional power of the clutch, and adjustments of the said blocks serves to permanently set the blocks for proper action and to compensate for any irregularity anywhere between the wooden or non-metallic and metallic parts. The wear of the shoes 9 may also be further compensated for, and the lever connections set primarily for proper action by adjustments of the abutments 17, accomplished, in the construction shown, by the set screws 18 and 20.

For convenience, the shaft 1 and clutch member 3 have been designated as driving members and the shaft 2 and clutch member 4 as driven members, but, as is evident, the said relation may be reversed. In some instances, a continuous shaft will be employed, in which case it will be preferable to make the clutch member 4 the driving member and to loosely journal clutch member 3 on the shaft. In this case the clutch member 3 would be the driven member and might be provided with a pulley, sprocket, gear, or other motion transmitting means.

The clutch described, while of very high efficiency, is strong and durable and is of comparatively small cost.

What I claim is:

1. The combination with axially alined driving and driven shafts, of clutch members secured to the adjacent ends of said shafts, one of said clutch members having an annular groove in its face and the other of said clutch members having a coöperative annular flange formed in its back with an annular groove, a friction shoe engageable with the latter noted annular groove, and actuating means between said first noted clutch member and said shoe.

2. A clutch comprising one member having annular grooves in one of which grooves is mounted a friction block, another member engageable with said friction block and having a coöperating groove engaging flange with an annular groove in the back of said flange, friction shoes engageable with the latter noted annular groove, and shoe operating connections carried by the first noted clutch member, substantially as described.

3. The combination with axially alined driving and driven shafts, of clutch members secured to the adjacent ends of said shafts, one of said clutch members having an annular approximately V-shaped groove in its face and the other of said clutch members having a coöperating approximately V-shaped annular flange formed in its back with an annular approximately V-shaped groove, friction shoes engageable with the latter noted annular groove, shoe actuating bars carried by the first noted clutch member, and clutch actuating levers reacting against said shoe actuating bars and against said first noted clutch member, substantially as described.

4. The combination with coöperating clutch members, of shoe actuating bars carried by one of said clutch members and provided with shoes engageable with the other clutch member, abutments adjustably applied to the back of the first noted clutch member, links connected to said abutments, levers connected to said links and the said shoe actuating bars, and means for simultaneously moving said levers to set the clutch and release the same at will, substantially as described.

5. The combination with axially alined driving and driven shafts, of clutch members secured to the ends of said shafts, one of said clutch members having an annular approximately V-shaped groove and the other clutch member having an annular approximately V-shaped friction flange with an annular approximately V-shaped groove in its back, friction shoes engageable with the latter noted groove, shoe actuating bars carried by the first noted clutch member, abutments adjustably secured to the said first noted clutch member, a clutch actuating sleeve loose on one of said shafts, three armed levers pivotally connected to said shoe actuating bars, and links connecting the said three armed levers to said abutments and to said sleeve, substantially as described.

In testimony whereof I affix my signature in presence of two witnesses.

AXEL E. JACOBSON.

Witnesses:
 ALICE V. SWANSON,
 HARRY D. KILGORE.